US009733144B2

(12) United States Patent
Miura et al.

(10) Patent No.: US 9,733,144 B2
(45) Date of Patent: Aug. 15, 2017

(54) ELECTRONIC DEVICE, CONTROL METHOD, AND CONTROL PROGRAM

(71) Applicant: KYOCERA Corporation, Kyoto-shi, Kyoto (JP)

(72) Inventors: Saya Miura, Yokohama (JP); Yosuke Nakanishi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/151,499

(22) Filed: May 11, 2016

(65) Prior Publication Data
US 2016/0334295 A1 Nov. 17, 2016

(30) Foreign Application Priority Data

May 12, 2015 (JP) ................. 2015-097772

(51) Int. Cl.
H04B 17/00 (2015.01)
H04B 13/02 (2006.01)
H04B 1/38 (2015.01)
G01L 19/14 (2006.01)
G01L 9/12 (2006.01)
G01L 19/00 (2006.01)
H04M 1/725 (2006.01)
H04M 1/18 (2006.01)

(52) U.S. Cl.
CPC .............. *G01L 19/149* (2013.01); *G01L 9/12* (2013.01); *G01L 19/0092* (2013.01);
(Continued)

(58) Field of Classification Search
CPC ...... G06F 3/0414; G06F 3/0418; G06F 3/044; G01L 19/149; H04M 1/18; H04M 2250/12
(Continued)

(56) References Cited

U.S. PATENT DOCUMENTS

2004/0108861 A1* 6/2004 Germiquet ............ G01F 23/265
324/663
2012/0146924 A1 6/2012 Inoue
(Continued)

FOREIGN PATENT DOCUMENTS

JP 2004-233913 A 8/2004
JP 2005-51415 A 2/2005
(Continued)

OTHER PUBLICATIONS

Office Action in JP Application No. 2015-097772, mailed Nov. 22, 2016, for which an explanation of relevance is attached.

*Primary Examiner* — Simon Nguyen
(74) *Attorney, Agent, or Firm* — Hauptman Ham, LLP

(57) ABSTRACT

In one implementation, an electronic device includes: a display; a sensor configured to measure information to be used for determining whether the electronic device is underwater; and at least one processor configured to determine, based on results of the measurement by the sensor, whether the electronic device has fallen into the water. Upon determining that the electronic device has fallen into the water, the at least one processor displays maintenance operation information for guiding a user to maintenance operations for the electronic device on the display. The electronic device is capable of, when the electronic device has fallen into the water, guiding a user so as to prompt the user to perform self-maintenance on the electronic device so that a breakdown or the like of the electronic device due to moisture left in the electronic device can be prevented.

17 Claims, 4 Drawing Sheets

(52) U.S. Cl.
CPC .......... *H04M 1/72522* (2013.01); *H04M 1/18* (2013.01); *H04M 2250/12* (2013.01); *H04M 2250/56* (2013.01)

(58) Field of Classification Search
USPC .................. 455/40, 67.11, 566; 345/174
See application file for complete search history.

(56) References Cited

U.S. PATENT DOCUMENTS

| | | | | |
|---|---|---|---|---|
| 2015/0009173 | A1* | 1/2015 | Rodzevski | G06F 3/0414 345/174 |
| 2015/0016001 | A1* | 1/2015 | Quirk | H02H 11/00 361/78 |
| 2015/0022481 | A1* | 1/2015 | Andersson | G06F 3/044 345/174 |
| 2015/0185919 | A1* | 7/2015 | Chang | G06F 3/0418 345/174 |
| 2016/0146935 | A1* | 5/2016 | Lee | G01S 15/02 367/87 |
| 2016/0266717 | A1* | 9/2016 | Oral | G06F 3/0418 |

FOREIGN PATENT DOCUMENTS

| | | |
|---|---|---|
| JP | 2005-328225 A | 11/2005 |
| JP | 2012-15716 A | 1/2012 |
| JP | 2012-85031 A | 4/2012 |
| JP | 2012-123740 A | 6/2012 |
| WO | 2011/021285 A1 | 2/2011 |

* cited by examiner

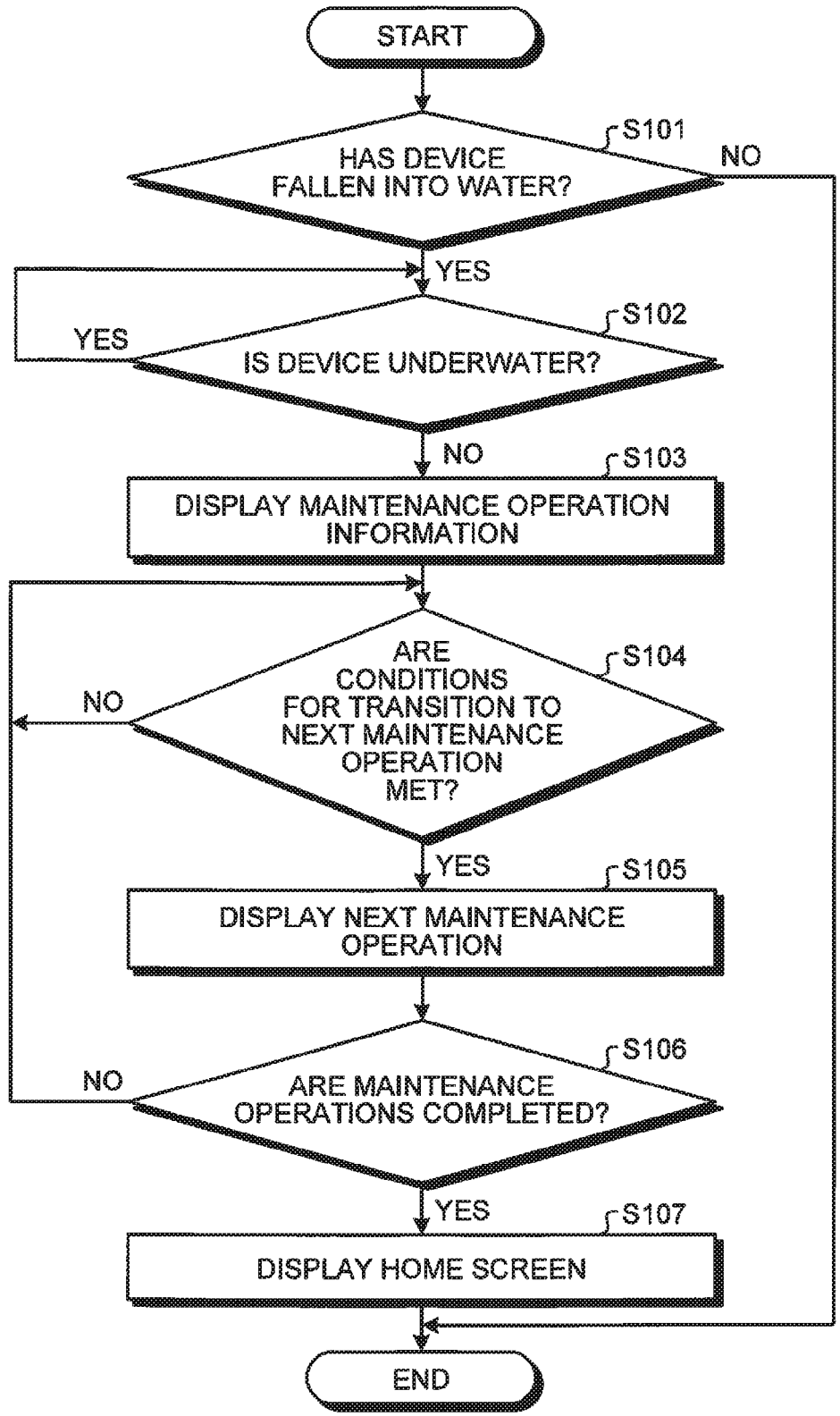

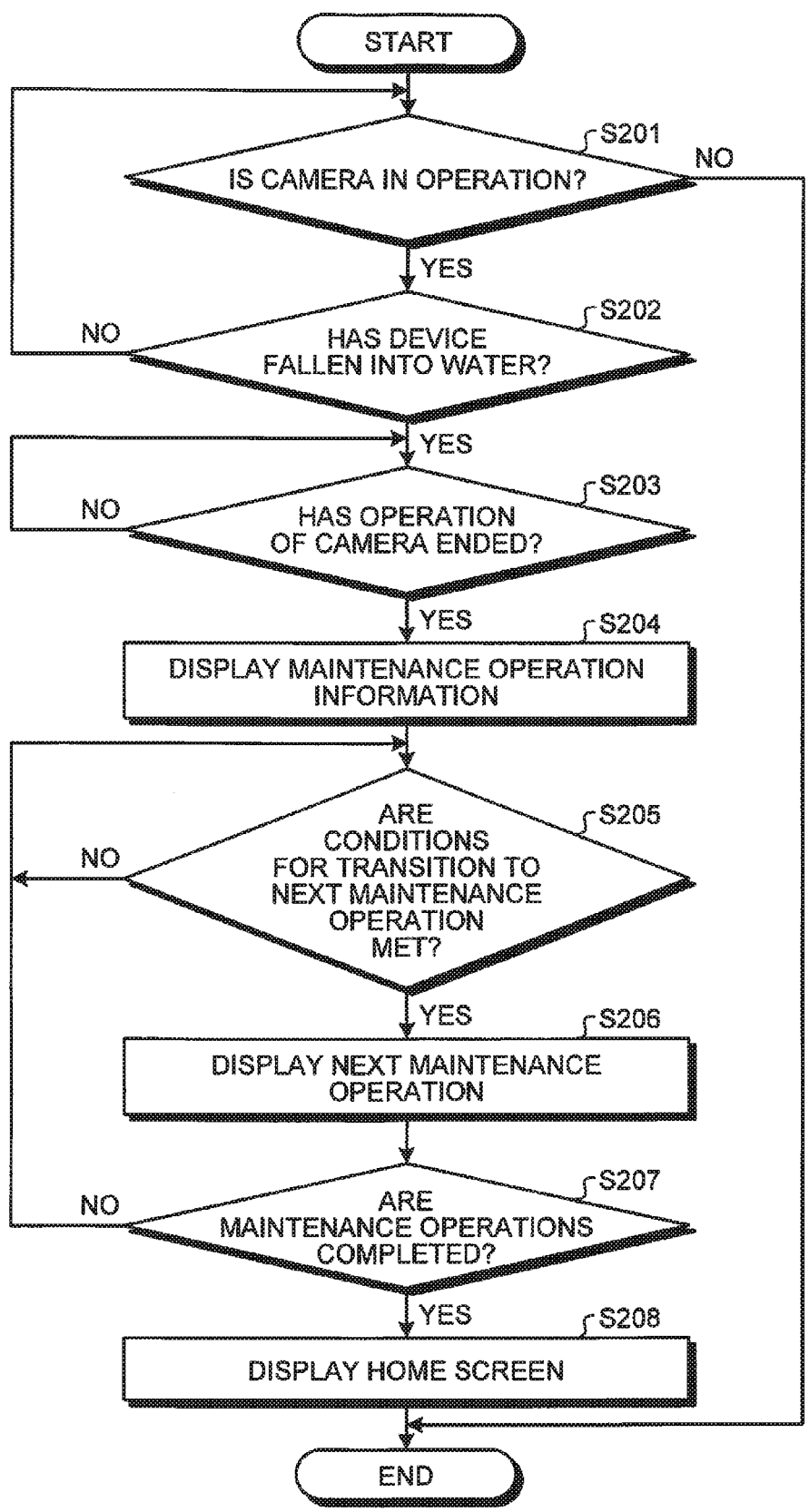

ELECTRONIC DEVICE, CONTROL METHOD, AND CONTROL PROGRAM

CROSS-REFERENCE TO RELATED APPLICATION

The present application claims priority to and incorporates by reference the entire contents of Japanese Patent Application No. 2015-097772 filed in Japan on May 12, 2015.

BACKGROUND

Field

The present application relates to an electronic device, a control method, and a control program.

Description of the Related Art

A known conventional electronic device changes, upon detecting water attached to an information display surface, manners of displaying information on the display surface (for example, refer to Japanese Laid-open Patent Publication No. 2012-123740).

Such a conventional electronic device has room for improvement in terms of notification about maintenance.

SUMMARY

It is an object of embodiments to at least partially solve the problems in the conventional technology.

According to one aspect, there is provided an electronic device comprising: a display; a sensor configured to measure information to be used for determining whether the electronic device is underwater; and at least one processor configured to determine, based on results of the measurement by the sensor, whether the electronic device has fallen into the water, wherein upon determining that the electronic device has fallen into the water, the at least one processor displays maintenance operation information on the display, the information guiding a user to maintenance operations for the electronic device.

According to one aspect, there is provided a control method to be executed by an electronic device including a display and a sensor configured to measure information to be used for determining whether the electronic device is underwater, the control method comprising: determining whether the electronic device has fallen into the water based on results of the measurement by the sensor; and displaying maintenance operation information on the display, the information guiding a user to maintenance operations for the electronic device when it is determined that the electronic device has fallen into the water.

According to one aspect, there is provided a non-transitory storage medium that stores a control program for causing, when executed by an electronic device including a display and a sensor configured to measure information to be used for determining whether the electronic device is underwater, the electronic device to execute: determining whether the electronic device has fallen into the water based on results of the measurement by the sensor; and displaying maintenance operation information on the display, the information guiding a user to maintenance operations for the electronic device when it is determined that the electronic device has fallen into the water.

The above and other objects, features, advantages and technical and industrial significance of embodiments will be better understood by reading the following detailed description of presently preferred embodiments, when considered in connection with the accompanying drawings.

BRIEF DESCRIPTION OF THE DRAWINGS

FIG. 3 is a flowchart illustrating a procedure of a process to be executed by a smartphone according to some embodiments; and FIG. 4 is a flowchart illustrating a procedure of a process to be executed by a smartphone according to some embodiments.

DETAILED DESCRIPTION OF THE PREFERRED EMBODIMENTS

A plurality of embodiments of an electronic device, a control method, and a control program according to the present application are described in detail with reference to the drawings. The following description uses a smartphone as an example of an electronic device according to the present application.

Embodiments

Figure 1:
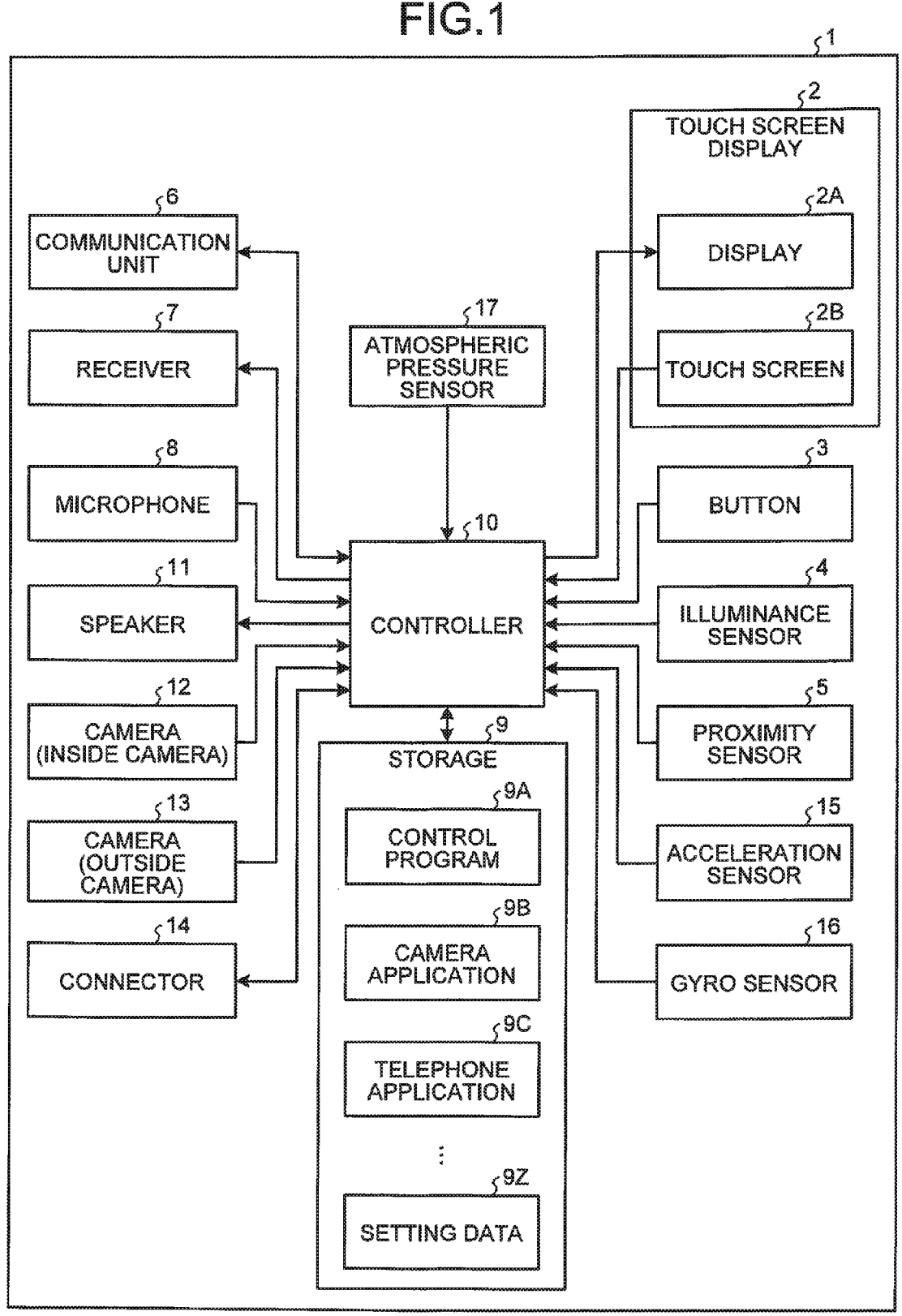
FIG. 1 is a block diagram illustrating a functional configuration of a smartphone according to some embodiments.

An example of a functional configuration of a smartphone 1 according to some embodiments is described with reference to FIG. 1. FIG. 1 is a block diagram illustrating a functional configuration of a smartphone according to some embodiments. In the following description, the same reference signs may be assigned to the same components. Redundant descriptions may be omitted.

As illustrated in FIG. 1, the smartphone 1 includes a touch screen display 2, a button 3, an illuminance sensor 4, a proximity sensor 5, a communication unit 6, a receiver 7, a microphone 8, a storage 9, a processor 10 (hereinafter called also "controller 10"), a speaker 11, a camera 12, another camera 13, a connector 14, an acceleration sensor 15, a gyro sensor 16, and an atmospheric pressure sensor 17. In the following description, a device referred to as "the own device" corresponds to the smartphone 1, and a component simply referred to as "the camera" corresponds to the camera 12 or the camera 13.

The touch screen display 2 includes a display 2A and a touch screen 2B. The display 2A and the touch screen 2B may be, for example, arranged with one on top of the other, arranged side by side, or arranged apart from each other. When the display 2A and the touch screen 2B are arranged with one on top of the other, the touch screen display 2 may have one or more sides of the display 2A, for example, not extending along any side of the touch screen 2B. The touch screen display 2 is an example of a display.

The display 2A can be provided with a display device such as a liquid crystal display (LCD), an organic electroluminescence (EL) display (OELD), or an inorganic electroluminescence display (IELD). The display 2A displays objects such as characters, images, symbols, or patterns. Screens containing objects such as characters, images, symbols, or patterns to be displayed by the display 2A include: a screen called a lock screen; a screen called a home screen; and an application screen to be displayed when an application is running. The home screen may be also called a desktop, a standby screen, an idle screen, a default screen, an application list screen, or a launcher screen. The display 2A is an example of the display.

The touch screen 2B detects contact of a finger, a pen, a stylus pen, or the like with the touch screen 2B. The touch screen 2B is capable of detecting, when a plurality of fingers, pens, or stylus pens or the like (hereinafter referred to simply as "finger") make contact with the touch screen 2B (the touch screen display 2), positions (hereinafter represented as contact positions) on the touch screen 2B to which the contact is made. The touch screen 2B notifies the controller 10 of contact of a finger with the touch screen 2B and also of a contact position thereof. In some embodiments, the touch screen 2B measures information to be used for determining whether the own device is underwater. When employing the capacitance method as a detection method, the touch screen 2B measures, for example, a variation in capacitance as the information to be used for determining whether the own device is underwater. The touch screen 2B is an example of a sensor. When employing the resistive film method or the load detection method as an alternative detection method, the touch screen 2B may measure, for example, a variation in voltage level as the information to be used for determining whether the own device is underwater. When employing the surface acoustic wave method as an alternative detection method, the touch screen 2B may measure, for example, an attenuated amount of a surface acoustic wave emitted by the own device, as the information to be used for determining whether the own device is underwater. When employing the infrared method as an alternative detection method, the touch screen 2B may measure, for example, an attenuated amount of infrared light emitted by the own device, as the information to be used for determining whether the own device is underwater.

A detection method employed by the touch screen 2B is not limited exclusively to the capacitance method, and may be any desired method such as the resistive film method, the load detection method, the surface acoustic wave method, or the infrared method.

The controller 10 (the smartphone 1) determines a type of a gesture, based on at least one of: a contact detected by the touch screen 2B; a position at which the contact has been detected; a change in position at which the contact has been detected; an interval between detection of contacts; and the number of times that a contact has been detected. The gesture is an operation performed on the touch screen 2B (the touch screen display 2) with a finger. Examples of a gesture that the controller 10 determines via the touch screen 2B include but are not limited to touching, long touching, releasing, swiping, tapping, double-tapping, dragging, flicking, pinching in, and pinching out. The controller 10 is capable of detecting an operation on an object displayed on the display 2A by determining a gesture.

The button 3 receives an operational input from a user. The number of buttons 3 may be one or more than one.

The illuminance sensor 4 detects illuminance levels. An illuminance level is a value of a light flux incident to a unit area of a measurement surface of the illuminance sensor 4. The illuminance sensor 4 is used for, for example, adjustment of the luminance of the display 2A.

The proximity sensor 5 detects the presence of a nearby object without making contact therewith. The proximity sensor 5 detects the presence of an object, based on a change in magnetic field, a change in return time of reflected waves of ultrasound waves, or the like. The proximity sensor 5 detects, for example, approaching of a face to the display 2A. The illuminance sensor 4 and the proximity sensor 5 may be configured as a single sensor. The illuminance sensor 4 may be used as a proximity sensor.

The communication unit 6 wirelessly communicates. Examples of a wireless communication standard supported by the communication unit 6 may include, for example, communication standards for cellular phones such as 2G, 3G, and 4G, and communication standards for short range communication. Examples of a communication standard for cellular phones may include, for example, Long Term Evolution (LTE), Wideband Code Division Multiple Access (W-CDMA), Worldwide Interoperability for Microwave Access (WiMAX (registered trademark)), Code Division Multiple Access (CDMA) 2000, Personal Digital Cellular (PDC), Global System for Mobile Communications (GSM (registered trademark)), and Personal Handy-phone System (PHS). Examples of a communication standard for short range communication may include, for example, IEEE802.11, Bluetooth (registered trademark), Infrared Data Association (IrDA), Near Field Communication (NFC), and Wireless Personal Area Network (WPAN). Examples of a WPAN communication standard may include ZigBee (registered trademark). The communication unit 6 may support one or more of the communication standards listed above.

The receiver 7 is a sound output module. The receiver 7 outputs, as sound, sound signals transmitted from the controller 10. The receiver 7 is capable of, for example, outputting the sound of a video and the sound of music reproduced on the smartphone 1 and the voice of a partner on calling. The microphone 8 is a sound input module, and converts the voice of a user and the like into sound signals to be transmitted to the controller 10.

The storage 9 stores therein a computer program and data. The storage 9 is utilized also as a work area that temporarily stores results of processes executed by the controller 10. The storage 9 may include any desirable non-transitory storage medium such as a semiconductor storage medium and a magnetic storage medium. The storage 9 may include a plurality of kinds of storage medium. The storage 9 may include a combination of a storage medium (such as a memory card, an optical disc, or a magneto optical disk) and a storage medium reader. The storage 9 may include a storage device such as a random access memory (RAM) that is utilized as a temporary storage area.

Computer programs stored in the storage 9 include applications to be executed in the foreground or in the background, and a control program (the illustration of which is omitted) that supports the operation of the applications. An application displays screens relating to the application on the display 2A when being executed in the foreground, for example. Examples of the control program include an operating system (OS). A computer program may be installed into the storage 9 via wireless communication using the communication unit 6 or via the non-transitory storage medium.

The storage 9 stores therein, for example, a control program 9A, a camera application 9B, a telephone application 9C, and setting data 9Z.

The touch screen 2B measures information to be used for detecting a change in the surrounding environment of the own device. In some embodiments, the control program 9A provides a function of determining, based on measurement results from the touch screen 2B, whether the own device has fallen into the water. Specifically, the control program 9A provides a function of determining, based on capacitances measured by the touch screen 2B, whether the own device is underwater. Underwater, capacitances measured by the touch screen 2B is in a state in which capacitances at individual contact points on the touch screen 2B show a distribution of being uniform around a certain constant value. The controller 10 executing the control program 9A is thus capable of determining whether the own device is underwater by detecting the distribution. In contrast, the controller 10 executing the control program 9A is thus capable of determining that the environment surrounding the own device has changed from the environment underwater to an environment non-underwater by detecting other distribution than the distribution.

The atmospheric pressure sensor 17 measures information to be used for determining whether the own device is underwater. In some embodiments, the control program 9A provides a function of determining, based on measurement results from the atmospheric pressure sensor 17, whether the own device has fallen into the water. Specifically, the control program 9A provides a function of, based on changes in atmospheric pressure value measured by the atmospheric pressure sensor 17, detecting an unique change that would be observed when the subject own device has fallen into the water. Atmospheric pressure values measured by the atmospheric pressure sensor 17 show a sharply increasing change when the own device falls into water. The control program 9A is thus capable of detecting this change and thereby determining whether the own device is underwater.

For determination as to whether the own device is underwater, the control program 9A may provide a function of determining whether the own device is underwater with taking account of both a determination result based on detection results from the touch screen 2B and a determination result based on detection results from the atmospheric pressure sensor 17. In this case, the controller 10 employs a process in which a determination result indicating that the own device is underwater is finalized on condition that a determination result indicating that the own device is underwater is obtained from at least one of the determination result based on detection results from the touch screen 2B and the determination result based on detection results from the atmospheric pressure sensor 17. The control program 9A may employ another process in which a determination result indicating that the own device is underwater is finalized on condition that determination results indicating that the own device is underwater are obtained from both of the determination result based on detection results from the touch screen 2B and the determination result based on detection results from the atmospheric pressure sensor 17. The control program 9A may employ another process in which whether the own device is underwater is determined by the determination result based on detection results from the touch screen 2B preferentially.

Upon determining that the own device has fallen into the water, the control program 9A displays maintenance operation information for guiding a user to maintenance operations for the own device on the display 2A. The control program 9A detects an operation performed by a user while displaying, on the display 2A, first information corresponding to a first operation included among the maintenance operations. The control program 9A provides a function of determining whether the operation performed by the user and thus detected is consistent with the first operation, and, if the operation is consistent with the first operation, displaying, on the display 2A, second information corresponding to a second operation included among the maintenance operations. The maintenance operations are operations that are performed, when the electronic device itself has fallen into the water, to perform self-maintenance on the own device so as to prevent the own device from suffering a breakdown or the like because of moisture left therein. The maintenance operations include a plurality of stepwise operations among which, upon completion of one operation, the next operation is permitted. Whether one operation is completed is determined based on at least one of the following events: an event that an operation on an object for transition to the next operation that is contained in the maintenance operation information is detected; an event that an operation on the button 3 is detected; and an event that an operation described in the maintenance operation information is performed by the user. The control program 9A determines, in cooperation with the acceleration sensor 15 and the gyro sensor 16, whether an operation performed by the user is consistent with the operation described in the maintenance operation information.

The control program 9A may employ a process in which, if the own device is not underwater after it is determined that the own device has fallen into the water, the maintenance operation information is displayed on the display 2A.

The control program 9A provides the function of, if a camera is in operation at the time of determining that the own device has fallen into the water, displaying the maintenance operation information on the display 2A after the operation of the camera ends. The control program 9A may employ a process in which, if the own device is not underwater after the operation of the camera ends, the maintenance operation information is displayed on the display 2A.

The camera application 9B provides functions for capturing images as still images and moving images, editing and managing images, and the like.

The telephone application 9C provides a telephone call function for telephone calls in wireless communication.

The setting data 9Z includes various data that are used in processes to be executed based on the functions provided by the control program 9A and the like and in processes to be executed based on the functions provided by the camera application 9B. The setting data 9Z includes data to be used for determining whether the own device is underwater. The data to be used for determining whether the own device is underwater includes reference data regarding the distribution of variations in capacitance underwater, and reference data regarding changes in atmospheric pressure underwater. The setting data 9Z includes data to be used for implementing individual functions of the camera application.

The controller 10 includes an arithmetic processor. Examples of the arithmetic processor include but are not limited to a central processing unit (CPU), a system-on-a-chip (SoC), a micro control unit (MCU), a field-programmable gate array (FPGA), and a coprocessor. The controller 10 integrally controls operation of the smartphone 1, thereby implementing various functions. The controller 10 is an example of a processor.

Specifically, the controller 10 executes commands contained in a computer program stored in the storage 9 while referring as necessary to data stored in the storage 9. The controller 10 then controls the functional modules in accordance with the data and the commands, thereby implementing the various functions. The examples of the functional module include but are not limited to the display 2A, the communication unit 6, the microphone 8, and the speaker 11. The controller 10 may change the control in accordance with a detection result from a detection module. The examples of the detection module include but are not limited to the touch screen 2B, the button 3, the illuminance sensor 4, the proximity sensor 5, the microphone 8, the camera 12, the camera 13, the acceleration sensor 15, the gyro sensor 16, and the atmospheric pressure sensor 17.

The controller 10 executes the control program 9A, thereby performing a process of determining, based on the measurement result from the touch screen 2B or the measurement result from the atmospheric pressure sensor 17, whether the own device has fallen into the water. The controller 10 executes the control program 9A, thereby performing a process of, upon determining that the own device has fallen into the water, displaying the maintenance operation information for guiding a user to maintenance operations for the own device on the display 2A. The controller 10 executes the control program 9A, thereby detecting an operation of the user while first information is being displayed on the display 2A. The first information corresponds to a first operation included among the maintenance operations. The controller 10 determines whether the operation thus detected of the user is the same as the first operation, and, if the operation is the same as the first operation, performs a process of displaying second information on the display 2A. The second information corresponds to a second operation included among the maintenance operations. The controller 10 determines, by using a detection result from the acceleration sensor 15 and a detection result from the gyro sensor 16, whether an operation performed by the user is the same as the second operation described in the maintenance operation information.

The controller 10 executes the control program 9A to be able to perform a process of, when a camera is in operation at the time of determining that the own device has fallen into the water, displaying the maintenance operation information on the display 2A after the operation of the camera ends.

Figure 2:
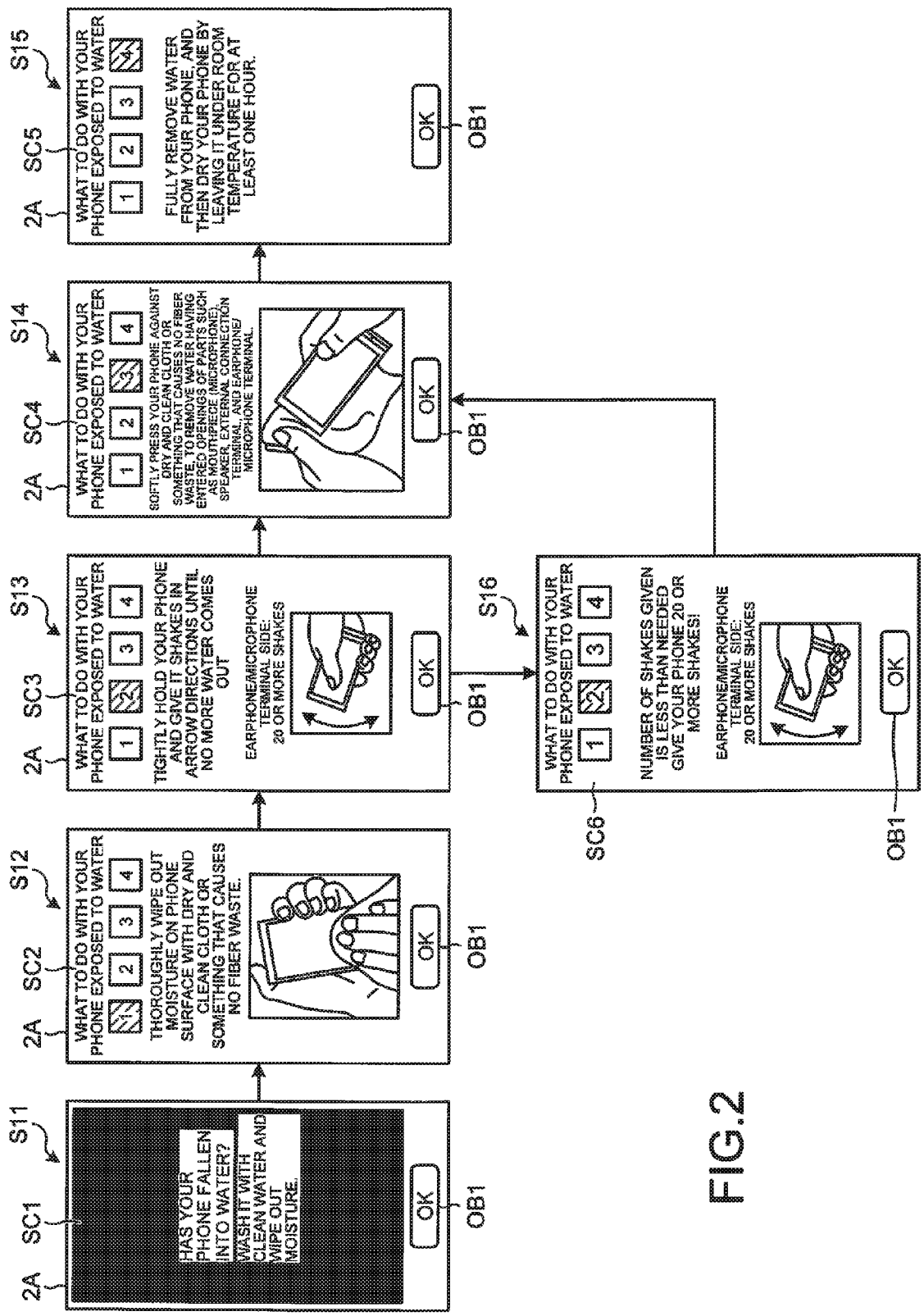
FIG. 2 is a diagram illustrating an example of control to be executed by a smartphone according to some embodiments.

FIG. 2 is a diagram illustrating an example of control to be executed by a smartphone according to some embodiments. The example illustrated in FIG. 2 explains an example in which, for some operations included among the maintenance operations, the smartphone 1 detects an operation executed by the user and determines whether the operation thus detected is consistent with an operation described in the maintenance operation information.

As illustrated in Step S11, the smartphone 1 displays a start screen SC1 for the maintenance operations on the display 2A upon determining that the own is underwater.

After confirming the start screen SC1, the user of the smartphone 1 perform an operation on an object OB1 provided on the start screen SC1.

The smartphone 1 receives the operation performed on the object OB1 provided on the start screen SC1. Upon receiving the operation, the smartphone 1 displays a first screen SC2 containing first information on the display 2A, at Step S12. The first information corresponds to a first operation from among the maintenance operations.

After actually performing the first operation, the user performs an operation on the object OB1 provided on the first screen SC2.

Upon receiving the operation performed on the object OB1 provided on the first screen SC2, the smartphone 1 displays a second screen SC3 containing second information on the display 2A, at Step S13. The second information corresponds to a second operation from among the maintenance operations. The second operation may be set as a maintenance operation to be performed next to the first operation.

After actually performing the second operation, the user performs an operation on the object OB1 provided on the second screen SC3.

Upon receiving the operation performed on the object OB1 provided on the second screen SC3, the smartphone 1 determines, whether an operation performed by the user before it receives the operation performed on the object OB1 is consistent with the second operation. If the operation performed by the user is consistent with the second operation, the smartphone 1 displays a third screen SC4 containing third information on the display 2A, at Step S14. The third information corresponds to a third operation from among the maintenance operations. The third operation may be set as a maintenance operation to be performed next to the second operation.

After actually performing the third operation, the user performs an operation on the object OB1 provided on the third screen SC4.

Subsequently, upon receiving the operation performed on the object OB1 provided on the third screen SC4, the smartphone 1 displays a fourth screen SC5 containing fourth information on the display 2A, at Step S15. The fourth information corresponds to a fourth operation from among the maintenance operations. The fourth operation may be set as a maintenance operation to be performed next to the third operation.

After actually performing the fourth operation, the user performs an operation on the object OB1 provided on the fourth screen SC5.

In a case where the maintenance operations end with the fourth operation, the smartphone 1 ends a process for the maintenance operations when receiving an operation performed on the object OB1 provided on the fourth screen SC5, and displays, for example, a home screen on the display 2A.

If the operation performed by the user is not consistent with the second operation at Step S13, the smartphone 1 displays, on the display 2A, a screen SC6 indicating that the second operation has not been completed yet, at Step S16. Subsequently, upon receiving an operation performed on the object OB1 provided on the screen SC6, the smartphone 1 again determines whether an operation performed by the user is consistent with the second operation, and, if it is consistent with the second operation, proceeds to control at Step S14.

The speaker 11 is a sound output module. The speaker 11 outputs, as sound, sound signals transmitted from the controller 10. The speaker 11 is capable of outputting, for example, a ringtone and music. One of the receiver 7 and the speaker 11 may functionally double as the other.

The camera 12 and the camera 13 convert captured images into electric signals. The camera 12 is an inside camera that captures an image of an object that faces the display 2A. The camera 13 is an outside camera that captures an image of an object that faces the opposite surface of the display 2A. The camera 12 and the camera 13 may be mounted on the smartphone 1 in a functionally and physically integrated state as a camera unit in which the inside camera and the outside camera can be switched from one to the other so that one of them can be used. The camera 12 and the camera 13 are examples of an imaging device.

The connector 14 is a terminal to which another apparatus is connected. The connector 14 may be a universal terminal such as a universal serial bus (USB), a high-definition multimedia interface (HDMI (registered trademark)), Light Peak (Thunderbolt (registered trademark)), or an earphone/microphone connector. The connector 14 may be a specialized connector such as a Dock connector. Examples of an apparatus to be connected to the connector 14 include but are not limited to an external storage, a speaker, and a communication apparatus.

The acceleration sensor 15 detects a direction and a magnitude of acceleration acting on the smartphone 1. The gyro sensor 16 detects, for example, a rotation angle (angular speed) of the smartphone 1. The atmospheric pressure sensor 17 detects an atmospheric pressure acting on the smartphone 1. The acceleration sensor 15 and the gyro sensor 16 are examples of an operation detecting unit. The atmospheric pressure sensor 17 is an example of the sensor.

The smartphone 1 may include a GPS receiver and a vibrator in addition to the above individual functional modules. The GPS receiver receives radio signals in a certain frequency band from GPS satellites, demodulates the radio signals thus received, and transmits the demodulated signals to the controller 10, thereby supporting arithmetic processing to find the current location of the smartphone 1. The vibrator vibrates a part or the entirety of the smartphone 1. The vibrator includes, for example, a piezoelectric element or an eccentric motor so as to generate vibration. Although not illustrated in FIG. 1, a functional module such as a battery that is inevitably used to maintain the functions of the smartphone 1, and a control module that is inevitably used to implement control of the smartphone 1 are mounted on the smartphone 1.

With reference to FIG. 3 and FIG. 4, the procedures of processes to be executed by the smartphone 1 according to some embodiments are described. FIG. 3 and FIG. 4 are flowcharts illustrating the procedures of processes to be executed by the smartphone 1 according to some embodiments. The processes illustrated in FIG. 3 and FIG. 4 are implemented when the controller 10 executes the control program 9A stored in the storage 9.

The process illustrated in FIG. 3 corresponds to the procedure of a process that the controller 10 executes in response to the determination that the own device has fallen into the water. As illustrated in FIG. 3, the controller 10 determines whether the own device has fallen into the water (Step S101).

If the controller 10 determines that the own device has fallen into the water (Yes at Step S101), the controller 10 determines whether the own device is still underwater (Step S102).

If the own device is still underwater (Yes at Step S102), the controller 10 repeats the determination at Step S102 described above.

On the other hand, if the own device is no longer underwater (No at Step S102), the controller 10 displays the maintenance operation information on the display 2A (Step S103).

Subsequently, the controller 10 determines whether conditions for transition to the next maintenance operation are met (Step S104). The conditions for transition to the next maintenance operation include at least one of the following events (refer to FIG. 2): an event that an operation on an object for transition to the next operation is detected that is contained in the maintenance operation information; an event that an operation on the button 3 is detected; and an event that an operation described in the maintenance operation information is performed by a user.

If the conditions for transition to the next maintenance operation are not met (No at Step S104), the controller 10 repeats the determination at Step 5104.

If the conditions for transition to the next maintenance operation are met (Yes at Step S104), the controller 10 displays a screen showing information on the next maintenance operation on the display 2A (Step S105).

Subsequently, the controller 10 determines whether the maintenance operations are completed (Step S106).

If the maintenance operations are not completed (No at Step S106), the controller 10 returns to the process step at Step S104 described above.

On the other hand, if the maintenance operations are completed (Yes at Step S106), the controller 10 displays the home screen on the display 2A (Step S107), and ends the process illustrated in FIG. 3.

If determining at Step S101 that the own device has not fallen into the water (No at Step S101), the controller 10 ends the process illustrated in FIG. 3.

The process illustrated in FIG. 3 is an example case where, after it is determined that the own device has fallen into the water, the maintenance operation information is displayed on the display 2A if it is determined that the own device is already not under the water. However, the process may be altered so that the maintenance operation information can be displayed on the display 2A after the elapse of a certain period of time from determination that the own device has gone under the water.

The process illustrated in FIG. 4 corresponds to the procedure of a process that the controller 10 executes upon determining that the own device has fallen into the water with a camera in operation. As illustrated in FIG. 4, the controller 10 determines whether any camera is in operation (Step S201).

If any camera is in operation (Yes at Step S201), the controller 10 subsequently determines whether the own device has fallen into the water (Step S202).

If the own device has not fallen into the water (No at Step S202), the controller 10 returns to the process step at Step S201 described above.

On the other hand, if the own device has fallen into the water (Yes at Step S202), the controller 10 subsequently determines whether the operation of the camera has ended (Step S203).

If the operation of the camera has not ended (No at Step S203), the controller 10 repeats the determination at Step S203.

On the other hand, if the operation of the camera has ended (Yes at Step S203), the controller 10 displays the maintenance operation information on the display 2A (Step S204).

Subsequently, the controller 10 determines whether conditions for transition to the next maintenance operation are met (Step S205). The conditions for transition to the next maintenance operation include at least one of the following events (refer to FIG. 2): an event that an operation on an object for transition to the next operation is detected that is contained in the maintenance operation information; an event that an operation on the button 3 is detected; and an event that an operation described in the maintenance operation information is performed by a user.

If the conditions for transition to the next maintenance operation are not met (No at Step S205), the controller 10 repeats the determination at Step S205.

On the other hand, if the conditions for transition to the next maintenance operation are met (Yes at Step S205), the controller 10 displays a screen showing information on the next maintenance operation on the display 2A (Step S206).

Subsequently, the controller 10 determines whether the maintenance operations are completed (Step S207).

If the maintenance operations are not completed (No at Step S207), the controller 10 returns to the process step at Step S205 described above.

On the other hand, if the maintenance operations are completed (Yes at Step S207), the controller 10 displays the home screen on the display 2A (Step S208), and ends the process illustrated in FIG. 4.

If no camera is in operation at Step S201 (No at Step S201), the controller 10 ends the process illustrated in FIG. 4.

The process illustrated in FIG. 4 is an example where, if the operation of the camera has ended, the maintenance operation information is displayed on the display 2A. However, the process may be altered so that the maintenance operation information can be displayed on the display 2A if the own device is not underwater.

In embodiments, the smartphone 1 displays, upon determining that the own device has fallen into the water, the maintenance operation information for guiding a user to maintenance operations for the own device on the display 2A. The smartphone 1 is thus capable of, when the own device has fallen into the water, guiding a user so as to prompt the user to perform self-maintenance on the own device so that a breakdown or the like of the own device due to moisture left therein can be prevented. Consequently, highly convenient notification control with improved notification regarding maintenance of a own device can be implemented according to embodiments.

The processes described as embodiments are also applicable to other electronic devices expected to have operations performed thereon underwater as well as to the smartphone 1.

In order to completely and clearly disclose the techniques according to the appended claims, characteristic embodiments have been described. However, embodiments are not intended to limit the appended claims. The appended claims are embodied by all modifications and alternative configurations that can be invented by those skilled in the art within the scope of the basic teaching set forth herein.

Although the embodiments have been described for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
a display;
a sensor configured to measure information to be used for determining whether the electronic device is underwater; and
at least one processor configured to determine, based on results of the measurement by the sensor, whether the electronic device has fallen into the water,
wherein upon determining that the electronic device has fallen into the water, the at least one processor displays maintenance operation information on the display, the information guiding a user to maintenance operations for the electronic device.

2. The electronic device according to claim 1, wherein the sensor includes at least one of a touch screen and an atmospheric pressure sensor.

3. The electronic device according to claim 1, further comprising: an imaging device, wherein when the imaging device is in operation at the time of determining that the electronic device has fallen into the water, the at least one processor displays maintenance operation information on the display after the operation of the imaging device ends.

4. The electronic device according to claim 1, further comprising: a detector configured to detect operations performed by a user,
wherein the maintenance operation information contains first information and second information, the first information corresponding to a first operation included among the maintenance operations, the second information corresponding to a second operation included among the maintenance operations, and the at least one processor determines whether an operation by the user detected upon the first information being displayed on the display is consistent with the first operation, and displays the second information on the display upon determining that the operation thus detected is consistent with the first operation.

5. The electronic device according to claim 4, wherein the detector includes at least one of an acceleration sensor and a gyro sensor.

6. The electronic device according to claim 4, wherein the first operation includes shaking the electronic device to remove the moisture on the electronic device that has fallen into the water.

7. The electronic device according to claim 4, wherein when the operation performed by the user is different from the first operation, the at least one processor is configured to display information that urges the user to perform the first operation until a determination that the operation performed by the user is consistent with the first operation.

8. The electronic device according to claim 1, wherein upon determining that the electronic device has fallen into the water, the at least one processor is configured to cause the display to display the maintenance operation information to guide the user by a plurality of stepwise operations to remove moisture on the electronic device that has fallen into the water, and
the maintenance operation information includes descriptions corresponding to the plurality of stepwise operations.

9. The electronic device according to claim 1, wherein upon determining that the electronic device has fallen into the water, the at least one processor is configured to cause the display to
display the maintenance operation information to guide the user by a plurality of stepwise operations to remove moisture on the electronic device that has fallen into the water,
keep displaying a description of a current operation among the plurality of stepwise operations until the current operation is completed, and
display a description of a next operation among the plurality of stepwise operations in response to a completion of the current operation.

10. The electronic device according to claim 1, further comprising an input unit, wherein
upon determining that the electronic device has fallen into the water, the at least one processor is configured to cause the display to display the maintenance operation information to guide the user by a plurality of stepwise operations to remove moisture on the electronic device that has fallen into the water, and
the at least one processor is configured to determine a completion of each operation among the plurality of stepwise operations when the input unit receives an input from the user.

11. The electronic device according to claim 1, wherein the at least one processor is configured to start displaying the maintenance operation information in response to a determination that the electronic device that has fallen into water is not underwater.

12. A control method to be executed by an electronic device including a display and a sensor configured to measure information to be used for determining whether the electronic device is underwater, the control method comprising:

determining whether the electronic device has fallen into the water based on results of the measurement by the sensor; and displaying maintenance operation information on the display, the information guiding a user to maintenance operations for the electronic device when it is determined that the electronic device has fallen into the water.

13. A non-transitory storage medium that stores a control program for causing, when executed by an electronic device including a display and a sensor configured to measure information to be used for determining whether the electronic device is underwater, the electronic device to execute:

determining whether the electronic device has fallen into the water based on results of the measurement by the sensor; and displaying maintenance operation information on the display, the information guiding a user to maintenance operations for the electronic device when it is determined that the electronic device has fallen into the water.

14. The electronic device according to claim 1, further comprising an input unit configured to receive an input from the user when the maintenance operations are performed by the user, wherein
   the at least one processor is configured to determine that one of the maintenance operations is completed when the input unit receives the input from the user, and
   the at least one processor is configured to
      cause the display to display a first information describing a first operation among the maintenance operations,
      determine whether the first information displayed on the display is consistent with an operation performed by the user in response to a determination that the first operation is completed, and
      cause the display to display a second information describing a second operation among the maintenance operations upon determining that the operation performed by the user is consistent with the first operation.

15. The electronic device according to claim 14, further comprising a detector configured to detect the maintenance operations performed by the user,
   wherein the at least one processor is configured to determine whether the operation detected upon the first information displayed on the display is consistent with the first operation.

16. The electronic device according to claim 14, wherein the first operation includes shaking the electronic device to remove the moisture on the electronic device that has fallen into the water.

17. The electronic device according to claim 14, wherein when the operation performed by the user is different from the first operation, the at least one processor is configured to display information that urges the user to perform the first operation until a determination that the operation performed by the user is consistent with the first operation.

* * * * *